US000001329H

United States Statutory Invention Registration [19]

[11] Reg. Number: H1329

Bailey et al.

[43] Published: Jul. 5, 1994

[54] DRILL COLLAR CONNECTIONS

[75] Inventors: Jeffrey R. Bailey; Richard P. McBride, both of Houston; Mark C. Moyer, Missouri City, all of Tex.; James B. Day, New Orleans, La.

[73] Assignee: Exxon Production Research Company, Houston, Tex.

[21] Appl. No.: 875,172

[22] Filed: Apr. 28, 1992

[51] Int. Cl.[5] ..... F16L 25/00

[52] U.S. Cl. ..... 285/334; 285/333

[58] Field of Search ..... 285/333, 334, 355, 390; 403/343

[56] References Cited

U.S. PATENT DOCUMENTS

| | | | |
|---|---|---|---|
| 2,745,685 | 5/1956 | Moore | 285/146 |
| 3,100,657 | 8/1963 | Pistole et al. | 285/333 X |
| 4,076,436 | 2/1978 | Slator et al. | 285/333 X |
| 4,509,777 | 4/1985 | Walker | 285/114 X |
| 4,549,754 | 10/1985 | Saunders et al. | 285/334 |
| 4,892,337 | 1/1990 | Gunderson et al. | 285/333 |
| 5,169,183 | 12/1992 | Hallez | 285/334 |

FOREIGN PATENT DOCUMENTS

| | | | |
|---|---|---|---|
| 654678 | 12/1962 | Canada | 285/333 |
| 413027 | 7/1934 | United Kingdom | 285/333 |

OTHER PUBLICATIONS

"Don't Ruin These New Drill Collars!", H. M. Rollins, Oil & Gas Journal, Mar. 14, 1966, pp. 81–100.

"Deep Drilling Practices in Mississippi", W. L. Kirk, Journal of Petroleum Technology, Jun. 1972, pp. 633–642.

"Tool-Joint Thread Redesign Cuts Stress, Increases Fatigue Life", F. J. Carlin and D. Saunders, Oil & Gas Journal, Jul. 22, 1985, pp. 75–78.

"A Contractor's History of Drillstring Failures in the Anadarko Basin", S. D. Hampton, SPE Conference Paper, New Orleans Conference, Mar. 15–18, 1987, pp. 177–189.

(List continued on next page.)

*Primary Examiner*—David H. Brown

*Attorney, Agent, or Firm*—Keith A. Bell; Kurt D. Van Tassel

[57] ABSTRACT

A threaded connection with improved fatigue-life useful for connecting adjacent sections of a pipe string subject to bending, tensile, and compressive stresses such as a drill collar string is disclosed. The connection comprises a pin member which is threadedly engageable with a corresponding box member. In the preferred embodiment, the inventive connection is designed to have bending strength ratio ("BSR") of about 3.20 or greater, and more preferably, in a range between about 3.20 and about 4.00. The preferred thread form of the connection is a V-type thread form having two flank angles of 30 degrees and a 0.038 inch root radius. Other design features may be used in combination with the threaded connection to further improve the connection's fatigue-life. Such design features include a tapered pin bore, an increased root radius for selected box threads, an internal box stress relief groove, a box bore stress relief groove, an extended pin relief groove, and modification of the API boreback box design to provide an increased number of threads having full threaded engagement.

15 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OTHER PUBLICATIONS

"Guides for Evaluating Drill Collar OD, ID, and Connection Combinations and Oil Field Thread Form", *Drilco Drilling Assembly Handbook,* Smith International, Inc., 1988, pp. 77–95 and 96–99.

"Larger Drillstrings Could Improve Contractor Profits", R. L. Dudman and R. A. Dudman, World Oil, Mar. 1990, pp. 83–91.

"Properties of Drill Collars, Section 3", *Recommended Practice for Drill Stem Design and Operating Limits,* API Recommended Practice 7G, American Petroleum Institute, Aug. 1, 1990, pp. 33–43.

"Tool Joints, Section 4; Drill Collars, Section 6; and Rotary Shouldered Connections, Section 9", *Specification for Rotary Drilling Equipment, API Specification 7,* American Petroleum Institute, Aug. 1, 1990, pp. 11–15, 18–23, 27–29, and 71.

Smith International, Inc. letter by D. W. Brinegar, Aug. 30, 1991 and referenced Drilco Tool Report excerpts, circa 1953, pp. 1–4 and 53.

DRILL COLLAR CONNECTIONS

FIELD OF THE INVENTION

The present invention relates generally to threaded connections for use in connecting adjacent sections of a pipe string. More particularly, but not by way of limitation, the invention pertains to threaded connections with improved fatigue life for use in connecting adjacent sections of a drill collar string or bottom-hole assembly which is subject to bending, compressive, tensile, and torsional stresses.

BACKGROUND OF THE INVENTION

Threaded connections for use in connecting adjacent sections of a pipe string are well known. In the oil and gas industry, threaded connections have long been used in a wide variety of applications, such as connecting adjacent sections of a well Casing, a drill string, or a pipeline.

As seen in FIG. 1, the drill string used for drilling into underground oil and gas reservoirs includes at least a drillpipe string 10, a drill collar string 12, and a drill bit 14. The drill collar string 12 comprises the major part of the bottom-hole assembly ("BHA") which is the lower section of the drill string between the drillpipe string 10 and the drill bit 14. Additional components of the BHA (not shown) may include other equipment such as measurement-while-drilling ("MWD") tools, the bit sub, drill-stem subs, crossover subs, shock subs, jars, stabilizers, reamers, fishing tools, and nonmagnetic collars. Drilling fluid is pumped down through the bore of the drillpipe string 10 and drill collar string 12 and through nozzles (not shown) located on the drill bit 14. The drilling fluid then becomes mixed with the rock dislodged by the drill bit 14 and returns to the surface through the annulus 15 between the borehole wall and drill string.

The drill collar string 12 is composed primarily of a series of heavy-walled pipes called drill collars and is used primarily to provide enough weight for producing the desired compressive load at the drill bit 14. Also, the drill collar string 12 may provide some additional weight to ensure that the drillpipe string 10 remains in tension. As a result of this weight, the lower portion of the drill collar string 12 experiences significant compressive stresses, while the upper portion of the drill collar string 12 experiences tensile stresses. Furthermore, when the drill collar string 12 rotates bending occurs at the drill collar joints or connections 18 (see FIG. 1A) which are the weakest points along the drill collar string 12. Consequently, fatigue failure resulting from this combination of compressive, tensile, and bending stresses typically occurs at the drill collar connections 18.

Drill collars 16 are normally manufactured in an average length of about 30 feet. Owing to the large wall thickness of the pipe, drill collars 16 are not provided with tool joints, which for drill pipe are typically stiffer and stronger than the pipe body itself, for connecting the drill collars 16. Instead, as seen in FIG. 1A, they are connected using a threaded connection 18 which comprises pin member 20 and box member 22, each of which is integrally machined from the pipe. The drill collar connection 18 is "made-up" by rotating the pin member 20 into the box member 22 up to the desired torque to form a metal-to-metal seal between adjacent drill collars at the shoulder 24 located at the base of the pin member 20 and the face end 28 of the corresponding box member 22. This make-up torque should be sufficient to prevent the seal from opening up under the bending loads produced as the drill string rotates.

Drill collar connections 18 are subjected to torsional stresses arising when the connection is made-up as well as compressive and bending stresses while drilling, discussed above. Consequently, in order to reduce premature fatigue failure, the drill collar connections 18 must be manufactured to withstand these various stresses while maintaining a fluid-tight seal under considerable internal pressure. The American Petroleum Institute ("API") provides connection specifications for assorted drill collar sizes based on the desired drill collar outside diameter ("OD"), inside diameter ("ID"), and bending strength ratio ("BSR"). API drill collar guidelines, for example, are identified in *Recommended Practice for Drill Stem Design and Operating Limits* ("RRP7G"), 14th Edition, Aug. 1, 1990, Section 3, while manufacturing specifications are provided in *Specification for Rotary Drilling Equipment* ("SPEC 7"), 37th Edition, Aug. 1, 1990, Sections 6 and 9 and Appendix I. API specifications are generally adhered to throughout the oil and gas drilling industry worldwide. However, a departure from these specifications is permissible where a significant improvement in drilling equipment performance can be realized using different specifications. Th design specifications of the inventive connections represent such a departure.

There is a natural variation between the strengths of the pin member 20 and box member 22 which occurs as their relative sizes vary along the axis of the connection. The pin member 20 may be so large that the portion of the box member 22 near the pin shoulder 24 would be so thin that it could not support the pin member 20 in bending. Farther from the shoulder 24, however, the tapered box wall thickens to a point where it can support the pin member 20 in bending. This point is usually in the region of the pin nose 23 (see FIG. 1A). It is generally believed by those skilled in the art that this region provides a likely site for fatigue failure with continual flexing of the drill collar connection 18, resulting in the box member 22 eventually failing in that region. Accordingly, to avert the early onset of such fatigue failure in the connection 18, the drilling industry has identified a generally preferred balance between box and pin strength to yield a "balanced connection". Using conventional drill collar design principles, the API specifications discussed above can assist a person skilled in the art in designing such a "balanced connection".

Bending strength ratio is a number typically used by those skilled in the art to quantify the balance between box and pin strength. BSR is the ratio of the box member modulus ($Z_B$) to the pin member modulus ($Z_P$). Since the member modulus (Z) is the measure of the member's capacity to resist any bending moment to which it may be subjected, the BSR is a number descriptive of the relative capacity of the box member 22 versus the pin member 20 to resist bending fatigue failures. Therefore, a higher BSR leads to a stronger box member and a correspondingly weaker pin member.

API recommended practice RP7G suggests that a connection having a BSR of 2.50 is generally accepted as an average balanced connection under average drilling conditions. However, RP7G further suggests that the acceptable BSR range may vary from 1.90 to 3.20 depending upon the drilling conditions. Nonetheless, certain published guidelines routinely used throughout the oil and gas drilling industry, such as the *Drilco Drilling Assembly Handbook,* generally recommend drill collar connections having a BSR in the range of 2.50 to 2.75 for obtaining well-balanced connections with optimum fatigue-life.

BSR is calculated in accordance with API RP7G (Appendix A.10) using the following relations.

$$BSR=(D^4-b^4)R/[D(R^4-d^4)] \quad (1)$$

where "D" is the drill collar's OD, "d" is the drill collar's ID, "b" is the thread root diameter of the box threads at the end of the pin (when connection is fully assembled), and "R" is the thread root diameter of pin threads ¾ inch from shoulder of pin.

In equation (1), "b" and "R" may be calculated from the following equations:

$$b = C - [tpr\,(L_{pc} - 0.625)/12] + (2 \times \text{dedendum}) \quad (2)$$

$$R = C - (2 \times \text{dedendum}) - \left(tpr \times \frac{1}{8} \times \frac{1}{12}\right) \quad (3)$$

$$\text{dedendum} = (H/2) - f_{rn} \quad (4)$$

wherein:

H=Thread height not truncated $f_{rn}$=Root truncation (inches)

C=pitch diameter (inches), measured at 0.625 inches from shoulder of pin $L_{pc}-0.625$=length from pitch diameter point to end of pin (inches)

tpr=taper, inches per foot on diameter

As shown by the above relationships, BSR depends on a number of variables including the drill collar's OD and ID, the pitch diameter and taper of the pin member 20 and box member 22, as well as pin length of certain thread dimensions. Normally the drill collar OD and ID are selected based on various operational considerations. Also, the thread dimensions are typically dictated by standard thread forms, such as the API V-0.038R, V-0.040, or V-0.050, preferred in the industry. Consequently, the desired BSR for the selected drill collar OD/ID and thread form could be obtained by machining the pin member 20 and box member 22 to yield the appropriate pitch diameter, taper, and pin length.

Currently, the drilling industry prefers connection designs using the boreback box design originally disclosed in U.S. Pat. No. 2,745,685 issued May 15, 1956 to Moore. This box design is preferred as a result of the relative ease in machining the box member. Also, the drilling industry has typically preferred those connection designs which favor preserving the pin member 20 relative to the box member 22. This preference for greater pin member strength relative to the box member 22 may have arisen because a crack before parting in the box member is more easily detected at the surface by a drop in mud pressure than is a comparable crack in the pin member. There is substantial incentive to detecting cracks before they propagate and cause separation because a downhole failure can be very difficult and costly to retrieve. However, using modern inspection practices, the likelihood of detecting pin member fatigue cracks has been significantly improved. Consequently, in the opinion of the inventors, it is presently possible to achieve a more cost-effective drill collar connection, in terms of both failure frequency and correction costs, by using connection designs which provide BSR values with improved box member strength at the expense of some pin member strength, even though such BSR values are contrary to the accepted practice of the API and others skilled in the art.

As mentioned previously, the oil and gas drilling industry has typically designed or selected drill collar connections having BSRs between about 2.25 and about 2.75 to avert early fatigue failures induced by bending stresses. Nevertheless, bending stresses are believed by the inventors to be the leading contributor to fatigue failures in drill collars and other BHA components which continue to plague the drilling industry. In the inventors' opinion, the overwhelming majority of these failures occur in the BHA connections as fatigue cracks, with a predominance of those failures occurring in the box member. Such failures can result in the loss of expensive tools located in the drill collars, lost rig time, and increased drilling costs arising from additional drill string trips.

Accordingly, there is a need for a threaded connection having improved fatigue-life for use in a drill collar string which is subject to bending stresses in combination with tensile and compressive stresses.

SUMMARY OF THE INVENTION

The improved fatigue-life threaded connection of the present invention comprises a pin member which is threadedly engageable with a corresponding box member. The pin member and box member are machined at the opposite ends of a given pipe section. The threaded portions of the pin member and box member are frustoconically shaped, resulting in a tapered thread engagement. The pin taper, pitch diameter, and pin length in combination with the selected thread form and drill collar inside and outside diameter are designed to yield a BSR of about 3.20 or greater, with a preferred BSR range of about 3.20 to about 4.00.

Preferably, the connection is adapted to an API boreback box design modified by reducing its cylindrical bore diameter. This box design modification increases the number of box threads having the standard crest truncation and root depth and thereby provides more threaded contact area between the threads of the pin member and box member. Consequently, this modification extends the length of full thread engagement between the pin member and box member. Additionally, the length of the pin may be increased, and in combination with the reduced box bore diameter, will further extend the length of full thread engagement between the pin member and box member. The modified box design may also be adapted to a pin member with a bore which is enlarged and tapered radially outwardly in the region of the pin nose. Also, a box bore stress relief groove may be adapted to this modified box design and placed adjacent to an unthreaded surface area which immediately follows the last box thread root. Alternatively, an internal box stress relief groove with a relatively large radius and depth may be cut in the back of the box member near the last few threads. Such a groove will reduce localized tensile stresses which typically cause failures in this region of the boreback box.

The preferred thread form is an API V-0.038R having a 60 degree included angle comprised of 30 degree flank o angles on each side. The thread root radius is 0.038 inches and the root truncation is 0.038 inches. However, the radius of the thread roots of the box member corresponding to the pin nose region may be increased to lower the stress concentrations in those thread roots where the box generally fails. This increased root radius is between about 0.050 inches and about 0.0625 inches.

BRIEF DESCRIPTION OF THE DRAWINGS

The advantages of the present invention will be better understood by referring to the following detailed description and the attached drawings in which.

While the invention will be described in connection with its preferred embodiments, it will be understood that the invention is not limited thereto. On the contrary, it is intended to cover all alternatives, modifications, and equivalents which may be included within the spirit and scope of the invention, as defined in the appended claims.

DETAILED DESCRIPTION OF THE PREFERRED EMBODIMENTS

The present invention is a threaded connection with improved fatigue-life for use in connecting adjacent sections of a drilling string which is subject to various mechanical stresses, but primarily compressive and bending stresses. The invention will be described and illustrated herein as a threaded connection for use in a drill collar or BHA string. However, the invention can assume many other embodiments and can be used for a variety of other purposes. To the extent that the following detailed description is specific to a particular embodiment or a particular use of the invention, this is intended to be by way of illustration and not by way of limitation.

As discussed more fully above, typically drill collar connections have been considered to be well-balanced with a BSR between 2.50 and 2.75. Therefore, most drill collar connections are designed to obtain a BSR in that range. The inventive threaded connection, however, is designed to obtain a BSR of about 3.20 or greater with a preferred BSR range of about 3.20 to about 4.00. Accordingly, for a drill collar having the specified OD, ID, and thread form, the pin taper, pin length, and pitch diameter become the remaining design element variables determining the connection's BSR. These design element variables and their selected values are discussed in detail below along with other design features which may be used in combination with such design element variables. Such other design features include a tapered pin bore, increased root radius for selected threads, stress relief grooves, and modification of the API boreback box design to provide increased thread engagement.

Experimental rotating/bending fatigue testing of drill collar connections having an API boreback box design and various BSR values in the range of approximately 2.0 to 4.0 has been conducted. These laboratory test results generally indicate that such connections with a BSR of about 3.2 or greater have, on average, approximately twice the fatigue life of those connections with a BSR of about 2.7 or smaller. This testing also indicates that the cylindrical bore region of the boreback box where corresponding threads of the box member and pin member are not fully engaged is a site especially susceptible to bending stresses and early fatigue failure. Therefore, the inventive connections having BSR values exceeding 3.2 provide a significant improvement in the fatigue-life of boreback box type connections heretofore not realized by those skilled in the art.

Figure 1:
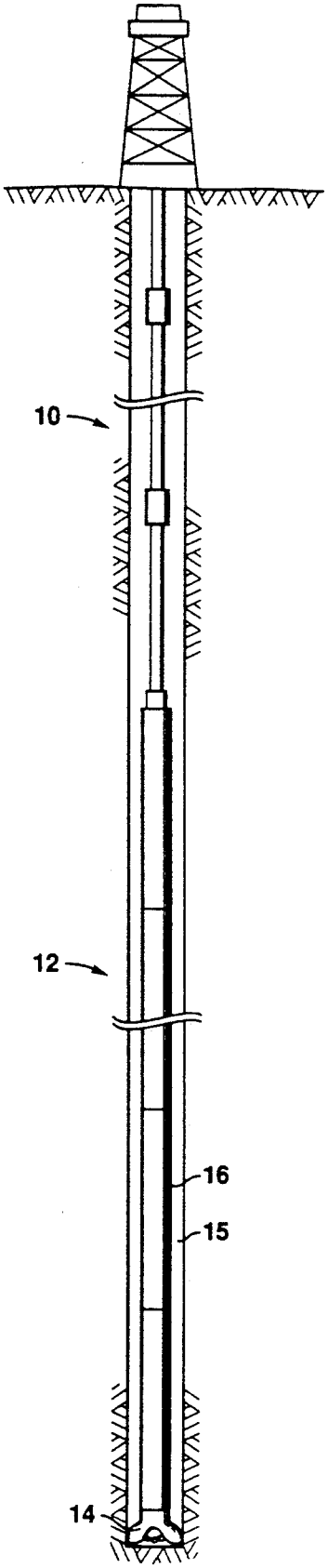
FIG. 1 PRIOR ART
FIG. 1 illustrates a typical drill string assembly comprising a drillpipe string, a drill collar string, and a drill bit.
Figure 1A:
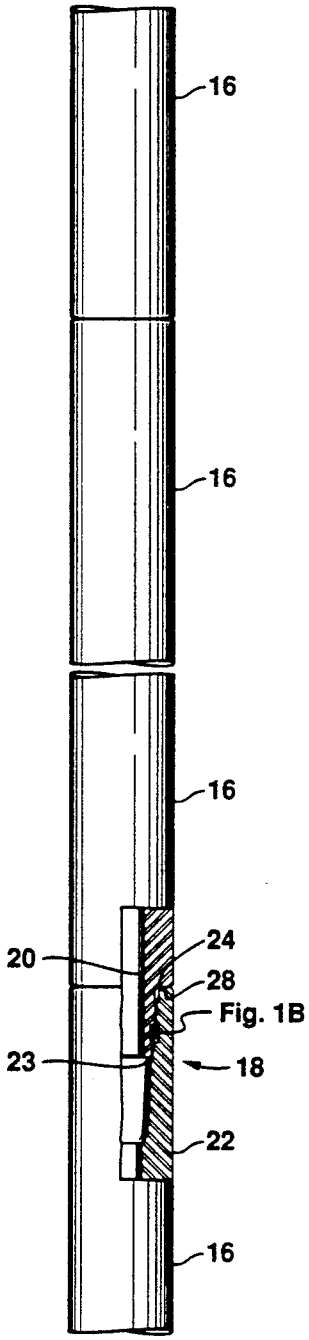
FIG. 1A PRIOR ART
FIG. 1A is an elevation, in partial section, of a drill collar string using a typical threaded connection; also shown is an enlarged view of the thread engagement.
Figure 1B:
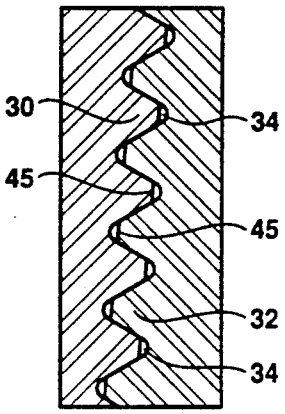
FIG. 1B PRIOR ART
FIG. 1B is an enlargement of the threaded portion shown in FIG. 1A.
Figure 2:
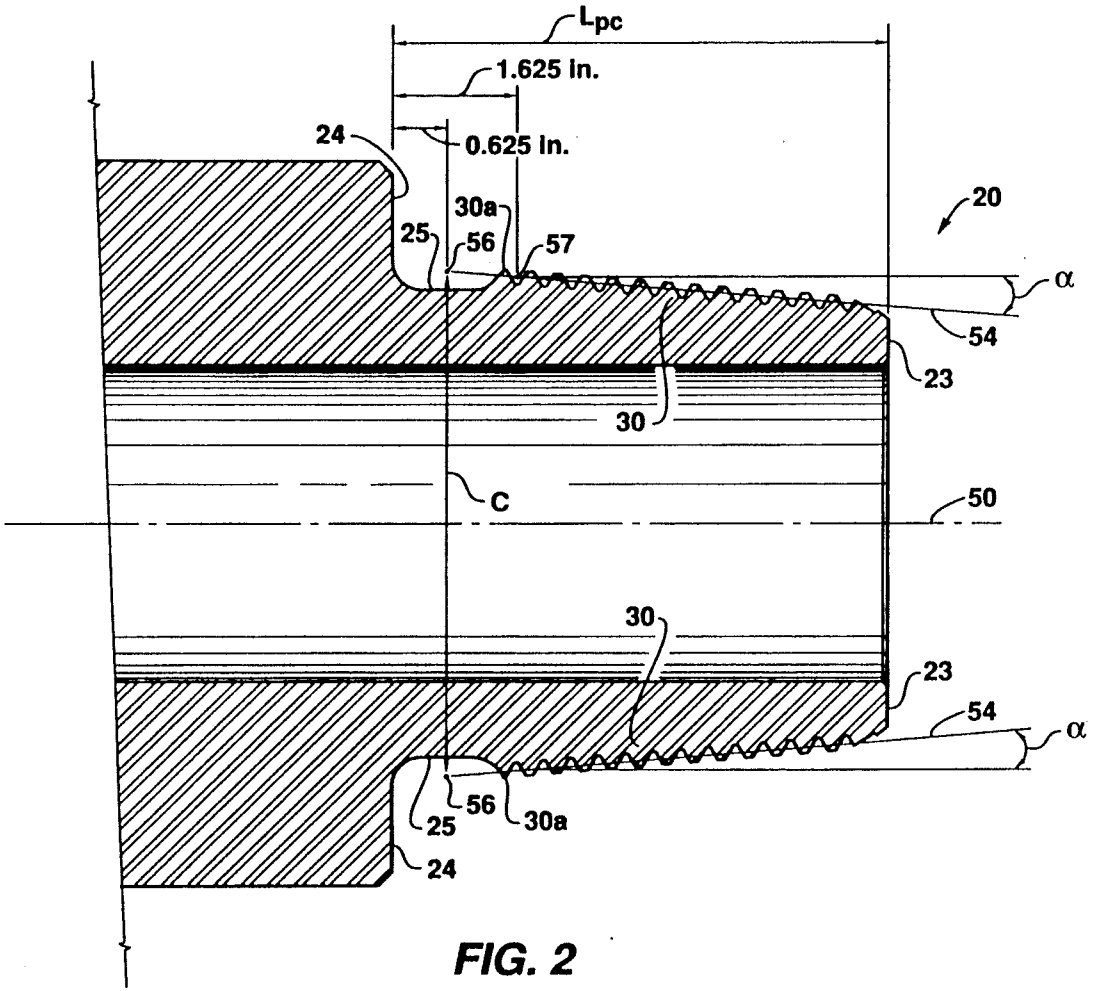
FIG. 2 is a cross section of a preferred embodiment of the pin member of the inventive threaded connection.

A preferred embodiment of the pin member 20 of connection 18 is illustrated in FIG. 2. As noted above, the connection 18 comprises a pin member 20 which is threadedly engageable with a corresponding box member 22 (not shown) which is formed on the next adjacent drill collar. Preferably, a pin member 20 and a box member 22 are integrally machined from the respective ends of the drill collar 16. Alternatively, such pin member 20 and box member 22 may be fabricated separately and subsequently attached to the ends of the drill collar. Machining the pin member 20 from the outside surface of one end of a first drill collar 16 produces an annular shoulder 24 at the base of the frustoconically shaped pin member 20. The mating box member 22 (see FIG. 1A) is produced by machining from the inside surface of one end of the adjacent drill collar 16 to produce a frustoconical shape corresponding to its mating pin member 20. The shoulder 24 provides an area of contact for a metal-to-metal seal between shoulder 24 and the face end 28 (see FIG. 1A) of the box member 22.

As previously mentioned, the connection 18 should be made up with sufficient torque to ensure the metal-to-metal seal is not broken when the connection 18 is subjected t various bending stresses. As illustrated in the enlarged view of the thread cross section in FIG. 1A, after make-up of the connection 18, the box threads 32 and pin threads 30 have a clearance 34 between them. The clearance 34 accommodates a lubricant typically used by those skilled in the art in making-up the connection 18. Specific details regarding the preferred make-up torque and doping material are identified in the API RP7G at Table 3.2.

Figure 3:
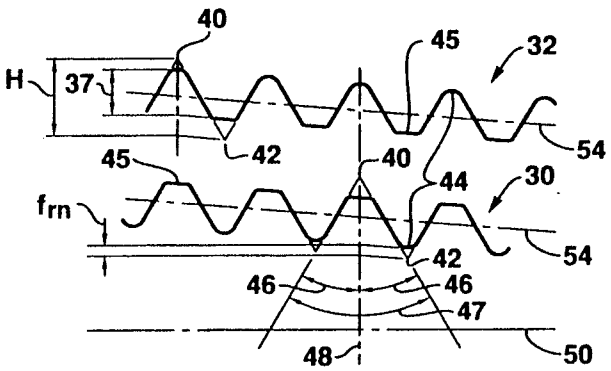
FIG. 3 PRIOR ART
FIG. 3 illustrates a V-type thread form used to produce the box thread and pin thread of the inventive threaded connection.

As noted above, a number of variables to the design of connection 18 contribute to the BSR ultimately obtained for connection 18. The inventive connection 18 is based, in part, upon using a V-shaped thread form. One embodiment of such a thread form is a V-0.038R identified in the API SPEC 7. This preferred thread form is shown in FIG. 3. The key thread dimensions used in determining the dedendum value (i.e., the depth of the truncated thread root) and hence the BSR are the nontruncated thread height (H) and the root truncation ($f_m$). The nontruncated thread height (H) may be measured on either the box thread 32 or pin thread 30 using the vertical (i.e., perpendicular to drill collar axis 50) distance between the ape 40 of a corresponding nontruncated thread crest and the tip 42 of a corresponding nontruncated thread root. The root truncation ($f_m$) may be measured on the pin thread 30 using the maximum vertical distance between the root radius 44 of a truncated root and the tip 42 of a corresponding nontruncated thread root. Naturally, the position of apex 40 and tip 42 is determined by flank angles 46 each being 30 degrees with respect to a plane 48 bisecting either the box thread 32 or pin thread 30 and normal to the drill collar axis 50. The included angle 47 (i.e., the sum of the flank angles 46) is 60 degrees. Also, the extent of root truncation ($f_m$) is determined by the root radius 44 as well as the flank angles 46.

For purposes of illustration only, values for these various thread form variables are identified in Table I below for the V-0.038R thread form used with two different taper angles. As seen in this table, the value of the nontruncated thread height H decreases slightly as the taper angle, alpha ($\alpha$), increases. Although the truncated thread height 37 is not used in calculating BSR, the corresponding values are provided for comparative purposes.

TABLE I

| Thread Form | Taper in. per ft. on diam. | Taper Angle, $\alpha$ | (Units of inches) Thread Height Not Truncated, H | Thread Height, Truncated (37) | Root Truncation, $f_m$ |
|---|---|---|---|---|---|
| V-0.038R | 2 | 4.8° | 0.2160 | 0.1218 | 0.0380 |
| V-0.038R | 3 | 7.1° | 0.2154 | 0.1214 | 0.0380 |

The inventive connection can be adapted to a wide range of drill collar sizes. However, the preferred embodiments of the inventive connection are adapted to those drill collars having OD/ID combinations most commonly used in the drilling industry. The preferred drill collar OD/ID combinations include 4¾ OD with 2¼ ID, 6½ OD With 213/16" ID, 7" OD with 2 13/16" ID, 8" OD with 2 13/16" ID, and 9½ OD with 3" ID.

With the drill collar OD/ID and thread form selected, the remaining design variables determining the BSR include the taper angle of the pitch line 54, the pitch diameter (C) of the pin member 20 at the pitch diameter point 56, and the pin length ($L_{pc}$) measured from shoulder 24 to pin nose 23. These design variables are best identified by referring to FIG. 2.

The pitch line 54 of the threads is inclined or tapered at a taper angle, $\alpha$, with respect to the s longitudinal axis 50 of the connection, resulting in a tapered thread engagement. The desired taper angle Will vary depending upon the drill collar OD/ID and of course the desired BSR. Naturally, for a given pitch diameter (C), a small $\alpha$ (i.e., less taper) will generally produce a weaker box connection with lower BSR, than a large $\alpha$ (i.e., more taper).

Alternatively, taper can be expressed as a function of the change in diameter per unit change in axial length. The preferred taper values listed in Tables I and II express taper as the reduction in the diameter of the pitch line 54 in inches per foot of distance along the drill collar axis 50. For example, a taper of 2 inches per foot on diameter would produce a two inch reduction in the pitch diameter (C) over a one foot distance along the drill collar axis 50. As expected, an increase in $\alpha$ provides an increase in the corresponding taper values.

According to standard API practice, the pitch diameter (C) of the pin member 20 is determined using a radius extending out from the drill collar axis 50 to a pitch diameter point 56 positioned along pitch line 54 and located 0.625 inch from the pin shoulder 24, as measured by a line parallel to drill collar axis 50 and directed towards pin nose 23. As can be seen in Table II below, a pitch diameter has been selected for each drill collar OD/ID combination listed which yields a BSR of 3.30 and 3.50 in combination with the other identified BSR design variables. However, other pitch diameters may be selected and combined with such others BSR design variables of substantially similar magnitude to yield a BSR in the preferred range of about 3.20 to about 4.00 without departing from the scope of the present invention. Threaded connections 18 designed accordingly would also have significantly improved fatigue-life compared to conventional connections.

As shown in FIG. 2, the pitch diameter (C) is determined using a point in space, i.e., the pitch diameter point 56, which cannot be gauged for purposes of making an actual measurement. The pitch diameter point 56 is conventionally used as a reference point for designing and comparing drill collar connections of various sizes. However, such a point is not useful for actually gauging the size of connection 18 under manufacturing and field conditions. Accordingly, FIG. 2 also identifies a gauge point 57 positioned along pitch line 54 and located 1.625 inches from the pin shoulder 24, as measured by a line parallel to drill collar axis 50 and directed towards pin nose 23. The gauge point 57 may be used to determine a gauge diameter corresponding to a connection 18 having the referenced pitch diameter (C) and taper angle $\alpha$. The gauge point 57 and corresponding gauge diameter can be measured using micrometer type instruments with dial indicators that are commonly used in the thread manufacturing industry and are accurate to ±0.0005 inch.

It should be noted that the corresponding box member will have the same pitch diameter (C) and gauge diameter as the pin member 20. The pitch diameter point 56 and the gauge point 57, respectively, are used to determine these diameters. However, for the box member 22 the position of each of these points along pitch line 54 is 0.625 inch and 1.625 inches, respectively, from its face end 28 (see FIG. 4), as measured by a line parallel to drill collar axis 50 and directed towards the back of the box member 22.

The pin length ($L_{pc}$) is the longitudinal distance between two planes perpendicular to the drill collar axis 50 with one plane containing the pin shoulder 24 and the other containing pin nose 23. Typical values of $L_{pc}$ range between about 3 and about 5½ inches, depending on the pipe size. For example, an $L_{pc}$ of 4.5 inches is common for 6½ inch OD drill collars. The $L_{pc}$ values shown in Table II were selected to remain within this preferred pin length range. However, as discussed more fully below, the pin length may be extended to reduce the stress on the pin threads 30 produced by a given bending moment.

Table II below provides examples of preferred design variable dimensions of various connections according to the present invention for commonly used drill collar OD and ID combinations. These dimensions yield the BSRs of 3.30 and 3.50 which fall within the preferred range of about 3.20 to about 4.00. However, these dimension be combined with other drill collar OD and ID combinations in a selected range to yield a BSR of about 3.20 or greater. Additionally, other variations in dominant design variable dimensions such as pin length ($L_{pc}$), pitch diameter (C) and/or taper can be used to produce a connection with a BSR in the preferred range. Root truncation ($f_{rn}$) and nontruncated thread height (H) might also be varied to produce a change in BSR, but they are typically left constant because their effect on BSR is relatively minor.

As noted previously, a V-type thread form, such as V-0.038R, is preferred for the inventive connection. Naturally, other thread forms are adaptable to the inventive connection. However, a thread form reasonably similar to API standard thread form allows for improved compatibility between BHA components with the inventive connection and existing components presently in service. It should be further noted that the pitch diameter, the threads per inch and taper control the interchangeability of pin and box members, rather than the drill collar OD and ID or thread length (i.e., length between the first and last perfect threads of the pin member). Therefore, to ensure that the pin and box member engage properly, the pitch diameter tolerance shown in Table II should be maintained, while the tolerances for the threads per inch and taper should be consistent with those published by API Spec. 7, Section 9.3.

TABLE II (Units of Inches)

| Drill Collar OD/ID | Thread Height Truncated (±0.005) | Threads per inch | Taper in. per ft. on diameter | Pin Length, $L_{pc}$ (±0.050) | Pitch Diameter, C (±0.005) | BSR |
|---|---|---|---|---|---|---|
| 4¾/2¼ | 0.120 | 4 | 2 | 4.000 | 3.434 | 3.3 |
| 4¾/2¼ | 0.120 | 4 | 2 | 3.750 | 3.388 | 3.5 |
| 6½/2 13/16 | 0.120 | 4 | 2 | 4.500 | 4.556 | 3.3 |
| 6½/2 13/16 | 0.120 | 4 | 2 | 4.500 | 4.500 | 3.5 |
| 7/2 13/16 | 0.120 | 4 | 2 | 4.500 | 4.835 | 3.3 |
| 7/2 13/16 | 0.120 | 4 | 2 | 4.500 | 4.772 | 3.5 |
| 8/2 13/16 | 0.120 | 4 | 2 | 5.000 | 5.429 | 3.3 |
| 8/2 13/16 | 0.120 | 4 | 2 | 5.000 | 5.352 | 3.5 |
| 9½/3 | 0.120 | 4 | 3 | 5.250 | 6.431 | 3.3 |
| 9½/3 | 0.120 | 4 | 3 | 5.250 | 6.335 | 3.5 |

Figure 4:
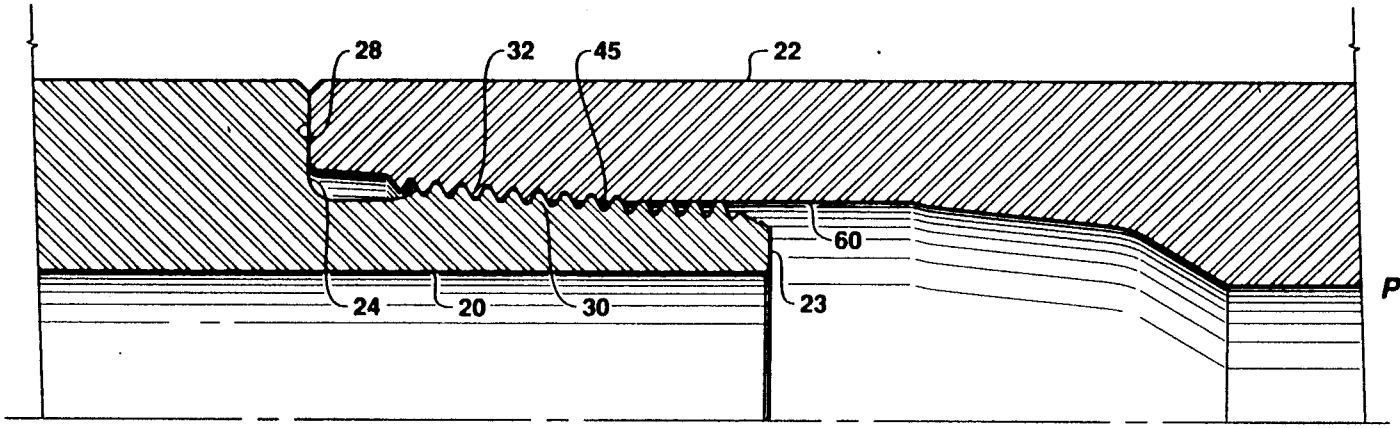
FIG. 4 PRIOR ART
FIG. 4 is a partial cross section of a standard pin and API boreback box with standard length of thread engagement.

FIG. 4 illustrates an API boreback box design. This design provides an untapered cylindrical bore 60 in a section of the box member 22 which truncates box threads 32 located in the region of the pin nose 23. Consequently, the roots of the box threads 32 become progressively shallower and ultimately vanish into the wall of the box member 22. This design, therefore, is intended to provide a length of untapered uniform wall section which distributes bending over a relatively long interval and thereby reduces the concentration of bending stresses in the box member 22. However, a shortcoming of this design is that pin threads 30 in the region of he pin nose 23 can engage only with corresponding box threads 32 which have progressively shallower roots. These shallower roots are produced by the cylindrical bore 60 truncating the crest 45 of such box threads 32 beyond the standard truncation for the selected thread form. Accordingly, this design yields less threaded contact area in the region of the pin nose 23 for sustaining loads at points of high stress concentration. As noted above, experimental and field data collected by the inventors suggest that this region becomes a focal point for stresses and early fatigue failures.

Figure 5A:
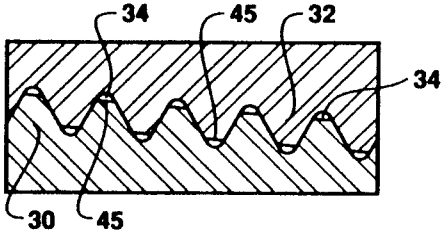
FIG. 5A is an enlargement of the threaded portion indicated in FIG. 5.
Figure 5:
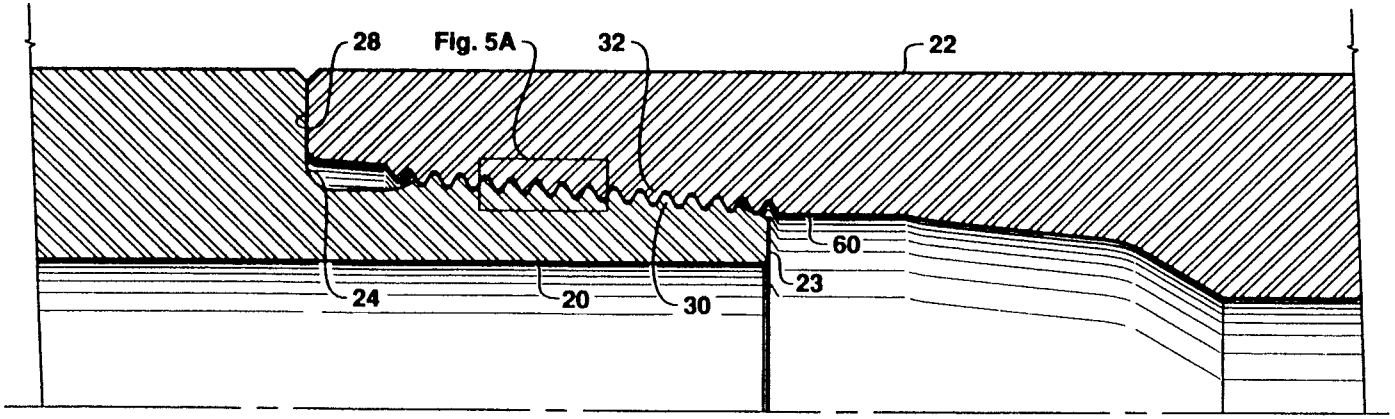
FIG. 5 is a partial cross section of a standard pin and a box modified to provide an extended length of full thread engagement; also shown is an enlarged view of the thread engagement.

FIG. 5 illustrates a modified box design which overcomes this shortcoming. The modification involves increasing the effective length of the threaded tapered section of box member 22 while decreasing the length and diameter of the box relief area or cylindrical bore 60. This results in extending the length of the pin-to-box full threaded engagement. More specifically, with this modification all of the pin threads 30 can engage fully with corresponding box threads 32 which each have the same standard crest truncation throughout the entire threaded portion of the box member 22 without creating a longer pin member. The increased number of fully engaged pin threads 30 and corresponding box threads 32 having such standard crest truncation provides more threaded contact area for sustaining loads at points of high stress concentrations. Such a modification also provides a thicker walled box member 22 at the point of high stress concentrations produced under bending loads.

In addition to modifying the relief area of the box design, as described above, the pin length ($L_{pc}$) may be extended along with a corresponding increase in the length of the threaded tapered section of box member 22. Preferably, the pin length and the corresponding threaded section of the box member 22 are increased by about one inch. In turn, this results in an increase in the length of the pin-to-box threaded engagement in an area of high stress concentration produced under bending loads which thereby acts to lower this stress concentration in connection 18. The extended pin length may also be adapted to other box member designs used in threaded connections.

Figure 6B:
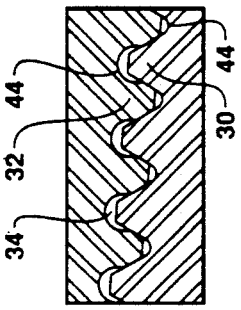
FIG. 6A and 6B are enlargements of the threaded portions as respectively indicated in FIG. 6.
Figure 6A:
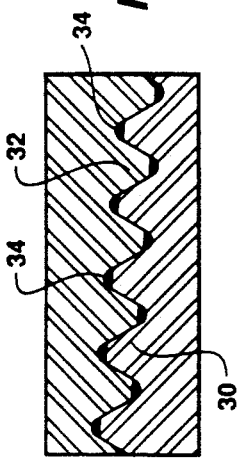
Figure 6:
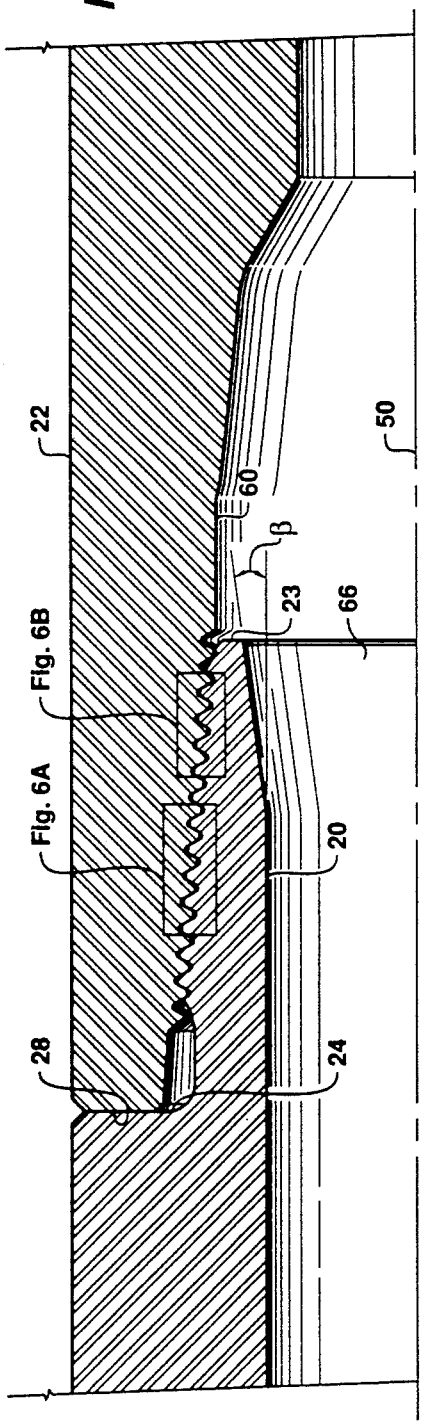
FIG. 6 is a partial cross section of a modified pin with tapered bore and modified box with an extended length of full thread engagement; also shown are the enlarged views of the thread engagement in two different areas of the connection.

FIG. 6 illustrates an internal taper modification to pin member 20 which may be used with or without the extended pin member 20 and in addition to the box relief area modification described above. The internal taper modification includes enlarging the pin bore 66 in the region of the pin nose 23. This is achieved by tapering pin bore 66 radially outwardly in the region of the pin nose 23 by an angle, beta ($\beta$), of about 6° with respect to the drill collar axis 50 and preferably with an axial length of taper between 30% to 40% of the pin length ($L_{pc}$). The basic effect of this internal taper is to increase the flexibility of the pin member 20 particularly in the region of the pin nose 23. The increased flexibility of pin member 20, in turn, reduces stress concentrations produced under bending loads in the corresponding region of the box member 22.

Referring back to FIG. 2, box stress concentrations may be reduced also by extending the length of the pin relief groove 25. Conventionally, the length of the pin relief groove 25 measured from the pin shoulder 24 to the crest of the first pin thread 30*a*, is 1 inch $\pm 1/32$ as suggested by the API SPEC 7. However, by extending the length of the pin relief groove 25 combination with the box is reduced and the point of this stress is shifted further away from the face end 28 of the box member 22 where the wall thickness of the box member 22 is greater. It is anticipated that the pin relief groove 25 would be extended by no more than approximately ½ the pin length ($L_{pc}$) so as to preserve both the threaded engagement and the compression required to seal the pin and box contact at the corresponding pin shoulder 24 and the face end 28 of the box member 22. Also, although not illustrated, the trough of the pin relief groove 25 may be parallel to the pitch line 54, rather than parallel to the drill collar axis 50, as shown in FIG. 2.

As discussed more fully above, the preferred thread form is an API V-0.038R. However, any thread form in combination with the other BSR design variables which yield a BSR of 3.20 or greater should have the improved fatique-life property of the inventive connection. Nonetheless, the V-0.038R is a preferred thread form because of its characteristically large root radius 44 and its compatibility with existing products and machine tools.

The selected thread form for the box member 22 may be modified, however, in the region of the box member 22 corresponding to the region of the pin nose 23 by increasing the root radius 44 of such thread form (see enlarged view of pin nose thread region, FIG. 6). This thread relief design modification is preferably adapted to the modified box design, described above, but may also be adapted to other designs of the box member 22. Preferably, the box threads 32 having the increased root radius 44 are those threads positioned between the midpoint of the threaded region of the box member 22 and the last box thread 32 nearest the pin nose 23. The root radius 44 of such a relief thread on box member 22 would be between about 0.0500 inch and 0.0625 inch. This thread relief design thereby provides lower stress concentrations in the box threads 32 in the region of box member 22 subject to high stresses and early fatique cracking.

Figure 7:
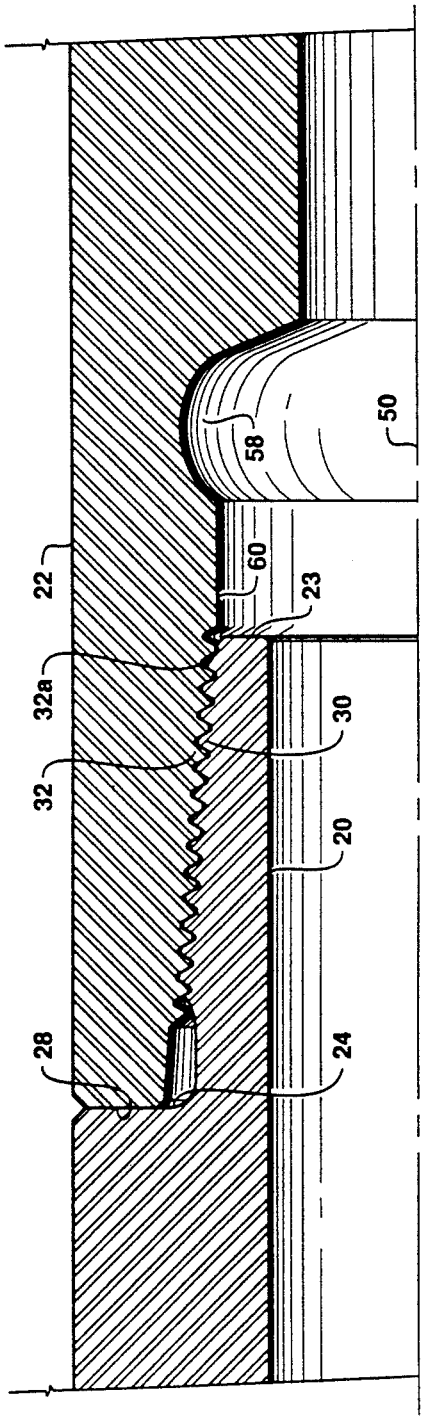
FIG. 7 is a partial cross section of the modified box design of FIG. 5 in combination with a box stress relief groove.
Figure 8:
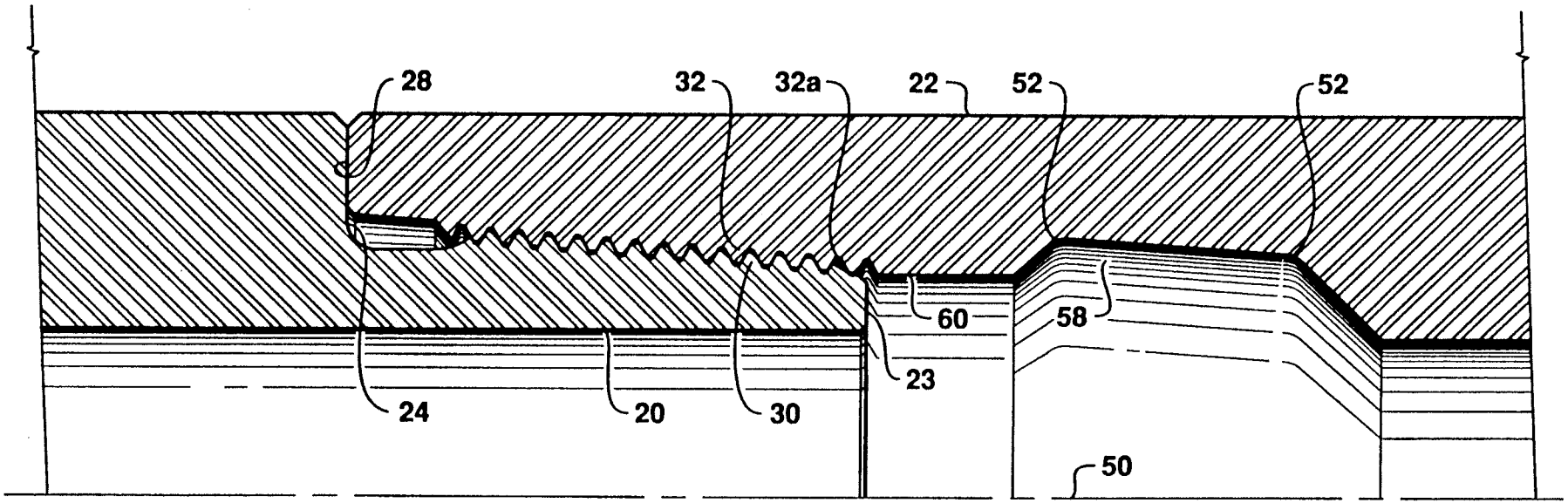
FIG. 8 is a partial cross section of the modified box design of FIG. 5 in combination with an alternative box stress relief groove.

FIG. 7 illustrates a box bore stress relief groove 58 recessed towards the back of the box member 32. Such a relief groove is useful for reducing stress concentration and improving stress flow in the box threads 32, particularly those box threads 32 in the pin nose region. The box bore stress relief groove 58 may be either elliptical or circular in shape. FIG. 7 illustrates a circular groove with a preferred radius of about 1 inch. Alternatively, as illustrated in FIG. 8, the box stress relief groove 58 may have two relatively large radii of curvature 52 (i.e., about 0.5 inch or more) with a midsection line positioned therebetween which is substantially parallel to the pitch line 54. Also, the box bore stress relief groove 58 should be placed a sufficient distance (i.e., at least 0.5 inch) from the last engaged box thread 32*a* to provide an unthreaded surface area on the inner wall of the box member 22. This unthreaded surface area may then permit subsequent remachining of new box threads 32 on the same box member 32 where the failed box threads 32 are in the pin shoulder region. This optical reduces the number of times in which the box member 22 must be completely severed from the pipe body and entirely remachined. Consequently, the useful life of a box member 22 may be extended. Alternatively, the section of cylindrical bore 60 extending between the last engaged box thread 32*a* and the box bore stress relief groove 58 may be partially or entirely threaded. Although the box bore stress relief groove 58 is only shown with the modified box design discussed above, it may also be adapted to the standard boreback or any other box design subject to similar stresses.

Figure 9:
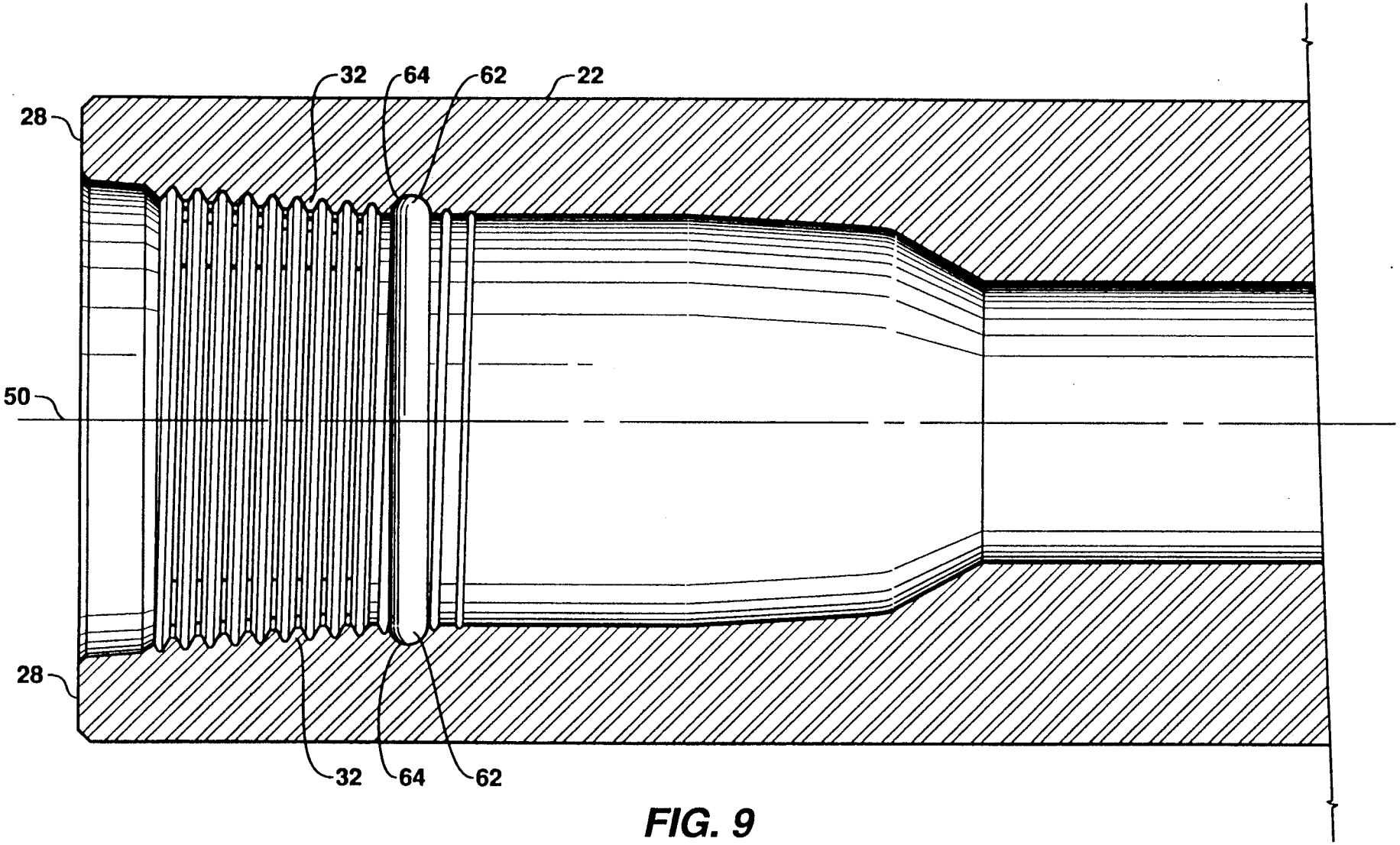
FIG. 9 is a cross section of a standard API boreback box with a thread stress relief groove.

FIG. 9 illustrates an internal box stress relief groove 62 placed near the last few box threads 32. Preferably the internal box stress relief groove 62 would be placed in the region where most failures of the box member 22 occur. Typically, this region would be in a range of approximately three to six threads back from the last engaged box thread 32*a* (see FIG. 8). However, the internal box stress relief groove may be placed at any point along the threaded surface of the box member 22. Such a stress relief groove would have a large radius of curvature relative to that of the thread roots and would thereby reduce stress concentration in the box threads 32. The internal box stress relief groove 62 may be either elliptical or circular in shape, but is preferably a circular groove with a radius between about 0.150 inch and about 0.250 inch.

Although the internal box stress relief groove 62 is shown with the standard boreback box design, it may also be adapted to the modified box design discussed above or any other box design subject to similar stresses. The particular advantage of this stress relief design is that the internal box stress relief groove 62 may be easily retrofitted to a box member 22 already in service.

The threaded connection of the present invention has been described in connection with its preferred embodiments. However, it is not limited thereto. Many changes and modifications will be obvious to those skilled in the art having the benefit of the foregoing teachings. All such changes and modifications are intended to be within the scope of the invention which is limited only by the following claims.

We claim:

1. A threaded connection for use in connecting two adjacent sections of pipe in a pipe string, said threaded connection comprising:

a) a generally tubular pin member on one end of a first pipe section having a longitudinal axis, at least a portion of said pin member having a generally frustoconical outer surface which tapers radially inwardly toward said end of said first pipe section, said frustoconical outer surface having pin threads formed thereon;

b) said pin member having a nose, a shoulder and a pin length equal to the axial distance between said nose and said shoulder;

c) a generally tubular box member on one end of a second pipe section, at least a portion of said box member having a generally frustoconical inner surface which tapers radially outwardly toward said end of said second pipe section, said frustoconical inner surface having box threads formed thereon which correspond to and are threadedly engageable with said pin threads formed on said pin member;

d) said box threads having a first engaged box thread corresponding to the pin thread nearest said shoulder and a last engaged box thread corresponding to the pin thread nearest said nose; and e) said threaded connection being designed and engineered so as to have a bending strength ratio of about 3.20 or greater.

2. The threaded connection of claim 1 wherein said pipe sections have an outside diameter of about 4.75 inches and an inside diameter of about 2.25 inches and wherein said pin threads and said box threads have a pitch of about 4 threads per inch, a taper of about 2 inches per foot on diameter, a pitch diameter of 3.434±0.005 inches, and said pin length of said pin member is between about 4.00 and about 5.00 inches.

3. The threaded connection of claim 1 wherein said pipe sections have an outside diameter of about 6.50 inches and an inside diameter of about 2.81 inches and wherein said pin threads and said box threads have a pitch of about 4 threads per inch, a taper of about 2 inches per foot on diameter, a pitch diameter of 4.556±0.005 inches, and said pin length of said pin member is between about 4.50 and about 5.50 inches.

4. The threaded connection of claim 1 wherein said pipe sections have an outside diameter of about 7.00 inches and an inside diameter of about 2.81 inches, and wherein said pin threads and said box threads have a pitch of about 4 threads per inch, a taper of about 2 inches per foot on diameter, a pitch diameter of 4.835±0.005 inches, and said pin length of said pin member is between about 4.50 about 5.50 inches.

5. The threaded connection of claim 1 wherein said pipe sections have an outside diameter of about 8.00 inches and an inside diameter of about 2.81 inches and wherein said pin threads and said box threads have a pitch of about 4 threads per inch, a taper of about 2 inches per foot on diameter, a pitch diameter of 5.429±0.05 inches, and said pin length of said pin member is between about 5.00 and about 6.00 inches.

6. The threaded connection of claim 1 wherein said pipe sections have an outside diameter of about 9.50 inches and an inside diameter of about 3.00 inches and wherein said pint threads and said box threads have a pitch of about 4 threads per inch, a taper of about 3 inches per foot on diameter, a pitch diameter of 6.431±0.005 inches, and said pin length of said pin member is between about 5.25 and about 6.25 inches.

7. The threaded connection of claim 1 further comprising:

a) said box member having a cylindrical bore adjacent to said last engaged box thread and coaxial with said axis, said cylindrical bore having a diameter substantially equal to the diameter of said nose of said pin member; and b) said box threads, each having a crest with substantially the same crest truncation, wherein said box threads are threadedly engageable with said pin threads.

8. The threaded connection of claim 7 further comprising a box bore stress relief groove positioned on said box member so that said cylindrical bore extends between said last engaged box thread and said box bore stress relief groove.

9. The threaded connection of claim 1 wherein a stress relief groove, having a radius of curvature between about 0.150 inch and about 0.250 inch, is placed on said box member between said first engaged box thread and said last engaged box thread.

10. A threaded connection for use in connecting two adjacent sections of pipe in a pipe string, said threaded connection comprising:

a) a generally tubular pin member on one end of a first pipe section having a longitudinal axis, at least a portion of said pin member having a generally frustoconical outer surface which tapers radially inwardly toward said end of said first pipe section, said frustoconical outer surface having pin threads formed thereon;

b) said pin member having a nose, a shoulder and a pin length equal to the axial distance between said nose and said shoulder;

c) a generally tubular box member on one end of a second pipe section, at least a portion of said box member having a generally frustoconical inner surface which tapers radially outwardly toward said end of said second pipe section, said frustoconical inner surface having box threads formed thereon which correspond to and are threadedly engageable with said pint threads formed on said pin member;

d) said box threads having a first engaged box thread corresponding to the pint thread nearest said shoulder and a last engaged box thread corresponding to the pin thread nearest said nose;

e) said box threads each having a crest with substantially the same crest truncation; and f) said box member having a cylindrical bore adjacent to said last engaged box thread and coaxial with said axis, said cylindrical bore having a diameter substantially equal to the diameter of said nose of said pin member.

11. The threaded connection of claim 10 further comprising a box bore stress relief groove positioned on said box member so that said cylindrical bore extends between said last engaged box thread and said box bore stress relief groove.

12. The threaded connection of claim 10 wherein said threaded connection is designed and engineered so as to have a bending strength ratio of about 3.20 or greater.

13. The threaded connection of claim 10 wherein a stress relief groove, having a radius of curvature between about 0.150 inch and about 0.250 inch, is placed on said box member between said first engaged box thread and said last engaged box thread.

14. A threaded connection for use in connecting two adjacent sections of pipe in a pipe string, said threaded connection comprising:

a) a generally tubular pin member on one end of a first pipe section having a longitudinal axis, at least a portion of said pin member having a generally frustoconical outer surface which tapers radially inwardly toward said end of said first pipe section, said frustoconical outer surface having pin threads formed thereon;

b) said pin member having a nose, a shoulder and a pin length equal to the axial distance between said nose and said shoulder;

c) a generally tubular box member on one end of a second pipe section, at least a portion of said box member having a generally frustoconical inner surface which tapers radially outwardly toward said end of said second pipe section, said frustoconical inner surface having box threads formed thereon which correspond to and are threadedly engageable with said pin threads formed on said pin member;

d) said box threads having a first engaged box thread corresponding to the pin thread nearest said shoulder and a last engaged box thread corresponding to the pin thread nearest said pin nose; and e) said box member having a stress relief groove, said groove having a radius of curvature between about 0.150 inch and about 0.250 inch, and positioned between said first engaged box thread and said last engaged box thread.

15. The threaded connection of claim 14 further comprising:

a) said box member having a cylindrical bore adjacent to said last engaged box thread and coaxial with said axis, said cylindrical bore having a diameter substantially equal to the diameter of said nose of said pin member; and b) said box threads, each having a crest with substantially the same crest truncation, wherein said box threads are threadedly engageable with said pin threads.

* * * * *